United States Patent [19]
Esmay

[11] Patent Number: 4,513,039
[45] Date of Patent: Apr. 23, 1985

[54] COMPOSITE OF SEPARABLE PRESSURE-SENSITIVE ADHESIVE TAPES

[75] Inventor: Donald L. Esmay, Coon Rapids, Minn.

[73] Assignee: Minnesota Mining and Manufacturing Company, Saint Paul, Minn.

[21] Appl. No.: 481,814

[22] Filed: Apr. 4, 1983

Related U.S. Application Data

[63] Continuation-in-part of Ser. No. 439,047, Nov. 3, 1982.

[51] Int. Cl.³ .......................... C09J 7/02; A61F 13/02
[52] U.S. Cl. ................................ 428/40; 204/159.22; 427/54.1; 428/344; 428/345; 428/352; 428/354; 428/355; 428/356
[58] Field of Search .................. 428/355, 356, 352, 40, 428/343, 344, 345, 354, 463, 520, 522; 427/54.1; 204/159.14, 159.22

[56] References Cited
U.S. PATENT DOCUMENTS

| 2,889,038 | 6/1959 | Kalleberg | 428/355 |
| 2,956,904 | 10/1961 | Hendricks | 428/345 |
| 4,181,752 | 1/1980 | Martens | 427/54.1 |
| 4,223,067 | 9/1980 | Levens | 428/308 |
| 4,243,500 | 1/1981 | Glennon | 204/159.12 |
| 4,303,485 | 12/1981 | Levens | 204/159.24 |
| 4,329,384 | 5/1982 | Vesley | 428/40 |
| 4,330,590 | 5/1982 | Vesley | 428/336 |

FOREIGN PATENT DOCUMENTS 747341 11/1966 Canada .

Primary Examiner—George F. Lesmes
Assistant Examiner—E. Rollins Buffalow
Attorney, Agent, or Firm—Donald M. Sell; James A. Smith; Carole Truesdale

[57] ABSTRACT

Composite of two pressure-sensitive adhesive tapes which are releasably adhered together adhesive face to adhesive face and then put to individual uses. The tapes are separable because their facing adhesives are substantially solvent-free, crosslinked alkyl acrylate polymers which can be aggressively tacky for uses requiring high-performance adhesion.

16 Claims, 3 Drawing Figures

COMPOSITE OF SEPARABLE PRESSURE-SENSITIVE ADHESIVE TAPES

CROSS-REFERENCE TO RELATED APPLICATIONS

This application is a continuation-in-part of Applicant's copending application Ser. No. 439,047, filed Nov. 3, 1982, and is based in part on disclosure in Applicant's copending application entitled "Linerless Double-Coated Pressure-Sensitive Adhesive Tape" filed of even date herewith (as Ser. No. 481,813).

FIELD OF THE INVENTION

The invention concerns a pressure-sensitive adhesive tape article including a double-coated pressure-sensitive adhesive tape which can be wound directly upon itself into a roll without a liner and when unwound can be used for such purposes as mounting articles.

BACKGROUND ART

U.S. Pat. No. 2,889,038 (Kalleberg) discloses a linerless double-coated pressure-sensitive adhesive tape wound upon itself in roll form and comprising a flexible support having on opposite faces chemically different and physically incompatible pressure-sensitive adhesives. Although the Kalleberg patent calls both layers "aggressively tacky", the patented linerless transfer tape is not currently used when high performance is required. Even though Kalleberg tapes are currently on the market, it is believed that at the present time all high-performance double-coated pressure-sensitive adhesive tapes are wound up with disposable, low-adhesion liners.

Applicant is not aware of any linerless double-coated pressure-sensitive adhesive tape other than that of Kalleberg and is not aware of any product incorporating Kalleberg's tape except the simple linerless tape now on the market as described in the patent.

DISCLOSURE OF INVENTION

The invention concerns a composite which incorporates a double-coated pressure-sensitive adhesive tape, but unlike the Kalleberg tape, the double-coated tape of the novel composite can have truly high performance and can have adhesive and cohesive values equal to those of any pressure-sensitive adhesive tape now on the market. Also unlike the Kalleberg tape, the double-coated tape of the novel composite does not require chemically different and physically incompatible adhesives at its two faces.

The novel composite includes a first tape comprising a flexible support, on each face of which is a pressure-sensitive adhesive, and a second tape comprising a flexible support, on at least one face of which is a pressure-sensitive adhesive layer. The first and second tapes are releasably adhered together adhesive face to adhesive face. Each pressure-sensitive adhesive of the novel composite (a) is a polymer of predominantly alkyl acrylate, the alkyl groups of which have an average of four to twelve carbon atoms,
(b) is substantially solvent-free,
(c) is crosslinked, and
(d) affords at each face a 180° Peelback Value (as defined below) of at least 10 N/dm. By "substantially solvent-free" is meant that the pressure-sensitive adhesive contains less than three percent by weight of solvent. The pressure-sensitive adhesive is sufficiently crosslinked when, on attempting to dissolve in heptane at room temperature, the undissolved gel component exceeds 50%.

A pressure-sensitive adhesive which provides a 180° Peelback Value of only 10 N/dm may be characterized as moderately tacky, being just tacky enough to assure reliable adhesion to ordinary paper, metal, glass, plastic, and painted substrates. When the adhesive at each face of the novel composite is aggressively tacky, its first and second tapes can nevertheless be readily peeled apart without delamination or offsetting of adhesive, even after months of storage. Each adhesive face of the novel composite can have a 180° Peelback Value as high as that of any pressure-sensitive adhesive tape now on the market, e.g., at least 30 N/dm.

It is surmised that if the adhesive were not solvent-free, the solvent would allow the polymer chains to knit across adjacent convolutions during prolonged storage in roll form, such that perfect separation of the two tapes could no longer be assured. In the present state of the art, it would not be commercially feasible to coat a pressure-sensitive adhesive from solution and obtain a pressure-sensitive adhesive layer which is substantially solvent-free such that aggressively tacky adhesive layers could reliably be separated without delamination or offsetting of adhesive.

To keep the amount of solvent to a minimum, the tapes of the novel composite preferably are made using photopolymerization as in U.S. Pat. No. 4,181,752 (Martens et al). No solvents are used when doing so. Although there inevitably are impurities in the starting materials which may have a solvent effect, such impurities would not comprise as much as three percent by weight of the pressure-sensitive adhesive. The preferred procedure for making the novel composite comprises the steps of (1) coating onto each face of a first flexible support a substantially solvent-free photopolymerizable monomer mixture,
(2) coating onto one face of a second flexible support a substantially solvent-free photopolymerizable mixture,
  each said photopolymerizable mixture comprising an alkyl acrylate, the alkyl groups of which have an average of 4–12 carbon atoms, and a crosslinker, and
(3) exposing each coating to ultraviolet radiation to polymerize the acrylate to provide a pressure-sensitive adhesive layer which
  (a) is crosslinked and
  (b) affords at each face a 180° Peelback Value of at least 10 N/dm.
(4) superimposing the resulting two tapes adhesive face to adhesive face, thus providing the novel composite. Those two tapes can later be peeled apart without delamination or offsetting of adhesive.

When the first flexible support of the novel composite is porous, it may be embedded in a single layer of pressure-sensitive adhesive. Whether or not that flexible support is porous, there may be a pressure-sensitive layer on each face of the support and those two layers may either be identical or different from each other.

Preferably prior to the aforementioned step (1) and before adding the crosslinker, the photopolymerizable mixture is first partially polymerized by ultraviolet radiation to provide a syrup having a coatable viscosity, e.g., 300 to 20,000 centipoises. After adding the crosslinker, such a syrup is coated out and then exposed to ultraviolet radiation in an inert environment to complete the polymerization while simultaneously crosslinking the polymer. An inert environment may be provided by plastic film overlays which are fairly transparent to ultraviolet radiation and have low-adhesion surfaces. Biaxially-oriented polyethylene terephthalate film which is about 75% transparent to ultraviolet radiation of 320 to 370 nm is very useful. If instead of covering the polymerizable coating, the polymerization is to be carried out in an inert atmosphere, the permissible oxygen content of the inert atmosphere can be increased by mixing into the polymerizable composition an oxidizable tin compound as taught in U.S. Pat. No. 4,303,485 (Levens), which also teaches that by doing so, thick coatings can be polymerized in air. If the monomer mixture is partially polymerized and the polymerization is to be completed in situ by heat, it is usually necessary to add additional heat-activatable polymerization initiator to the partially polymerized composition.

Solvents can also be substantially avoided by in situ polymerization by electron beam as suggested in U.S. Pat. No. 4,243,500 (Glennon). See also U.S. Pat. No. 2,956,904 (Hendricks).

The pressure-sensitive adhesive of the novel tape can be substantially solvent-free if polymerized and coated from aqueous systems. However, coatable aqueous emulsions usually contain organic materials which are themselves solvents for pressure-sensitive adhesives, and it may be difficult to eliminate them substantially.

To attain high 180° Peelback Value, the pressure-sensitive adhesive may be made using one or more copolymerizable monomers having strongly polar groups such as acrylic acid, methacrylic acid, itaconic acid, acrylamide, methacrylamide, acrylonitrile, methacrylonitrile, or N-vinyl-2-pyrrolidone. Amounts of such copolymerizable monomers up to about 12 mol percent (25 mol percent when using the pyrrolidone) of total monomer tend to provide increased 180° Peelback Value while higher amounts tend to result in decreased 180° Peelback Values unless heat is applied when the bond is formed. Where heat is to be applied in forming bonds, a strongly polar copolymerizable monomer can provide nearly 50 mol percent of total monomer.

Other useful copolymerizable monomers include vinyl toluene, vinyl chloride, vinylidene chloride, styrene, and diallyl phthalate. One or more of these may be employed in amounts up to 5 mol percent of total monomer without appreciably changing any of the pressure-sensitive adhesive properties.

At constant levels of strongly polar and other copolymerizable monomer, the highest 180° Peelback Values have been attained when the alkyl acrylate monomer includes both a $C_{5-14}$ acrylate and a $C_{1-4}$ acrylate. Preferred as the $C_{5-14}$ acrylate is isooctyl acrylate obtained by esterifying acrylic acid with isooctyl alcohol, a mixture of various isomers of octyl alcohol which is readily available commercially at relatively low prices. Preferred $C_{1-4}$ acrylates are obtained from methyl, ethyl or n-butyl alcohol, which also are readily available at reasonable prices. Acrylic acid is a preferred strongly polar copolymerizable monomer, being both low in cost and easily copolymerizable with the alkyl acrylate, especially by the procedure of the aforementioned U.S. Pat. No. 4,181,752.

Homopolymers of useful alkyl acrylates are weak internally but when crosslinked should develop useful internal strengths as indicated by Shear Values of at least 3 minutes. Higher internal strengths can be achieved through the use of one or more of the strongly polar copolymerizable monomers mentioned above.

Among crosslinking agents useful in making the novel composite by photopolymerization as in the above-cited Martens patent are those which also function as photopolymerization initiators such as 2,4-bis(trichloromethyl)-6-p-methoxystyryl-s-triazine. The chromophore-substituted-halomethyl-s-triazines of U.S. Pat. Nos. 4,329,384 and 4,330,590 are especially useful where a high 180° Peelback Value is desired. Other useful photocrosslinkers are polyacrylic-functional monomers such as trimethylolpropane triacrylate; pentaerythritol tetraacrylate; 1,2-ethylene glycol diacrylate; 1,6-hexanediol diacrylate; and 1,12-dodecanediol diacrylate. Each of these photocrosslinkers is preferably used within the approximate range of 0.05 to 0.5 percent by weight of the polymerizable monomers.

To speculate on the reason for the surprising capability of separating the tapes of the novel composite, it is surmised that the crosslinking knits the polymer chains together at each face of the composite such that the contacting pressure-sensitive adhesive surfaces separate cleanly at their interface when peeled apart. Other phenomena may also be involved. For example, when the polymer is made using one or more copolymerizable monomers having strongly polar groups, those groups may turn inwardly, leaving the relatively nonpolar alkyl chains at the surface, thus providing a release effect.

To enhance immediate adhesion to relatively rough or uneven surfaces, either flexible support of the novel composite may be a resilient foam such as the backing foam of Canadian Patent No. 747,341 (Engdahl et al). Another technique for enhancing immediate adhesion to relatively rough or uneven surfaces is to incorporate glass microbubbles into the pressure-sensitive adhesive as taught in U.S. Pat. No. 4,223,067 (Levens). Other materials which can be blended with the polymerizable mixtures include reinforcing fibers and agents, fire retardants, and inert fillers. If the polymerization is to be effected by ultraviolet radiation, such materials should allow the radiation to penetrate into the entire coating during the photopolymerization step.

When either flexible support of the novel composite is a transparent plastic film such as polyvinyl chloride, that tape can be almost perfectly transparent. When the flexible support of a tape of the novel composite is transparent and the pressure-sensitive adhesive of that tape is unpigmented and hence transparent, the tape may be put to uses such as are described in connection with FIG. 3 of the drawing.

180° Peelback Value

At about 22° C., tape is adhered by its adhesive to a glass or stainless steel test plate under the weight of a 4.5 kg hard rubber roller, 2 passes in each direction. The free end of the tape is attached to a scale, and the test plate is moved away from the scale at an angle of 180° and a rate of about 3.8 cm per second.

Shear Value

At about 22° C., tape is adhered by its pressure-sensitive adhesive to a stainless steel plate under the weight of a 4.5-kg hard rubber roller, 2 passes in each direction, with a free end of tape extending beyond the plate and the adhesive contact area being one-half by one-half inch (1.27 by 1.27 cm). After thirty minutes, the plate is positioned 2° from the vertical to prevent peeling, and a 1-kg mass is suspended from the free end. The time at which the mass falls is noted and the test is discontinued if the tape has not failed after 10,000 minutes.

THE DRAWING

Figure 1:
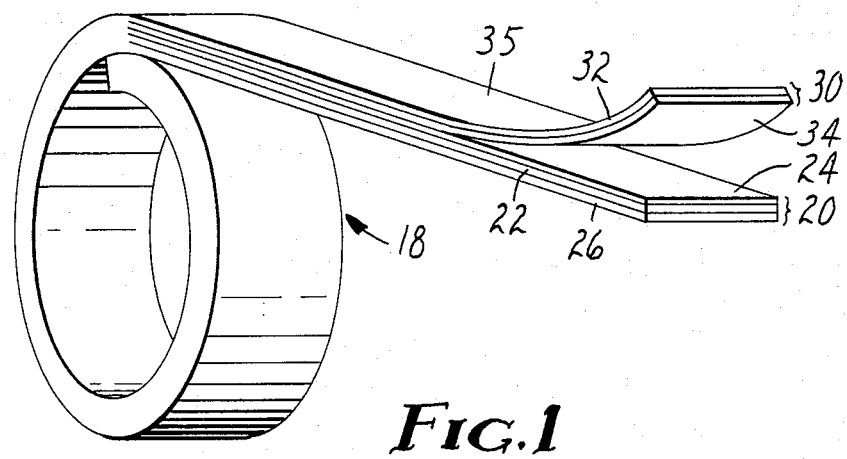
FIG. 1 is a schematic isometric view of a 2-tape composite of the invention which is being unwound from a roll.

In FIG. 1, a composite roll 18 consists of two tapes 20 and 30. The first tape 20 has a flexible transparent plastic film support 22, at each face of which is a pressure-sensitive adhesive layer 24, 26. The second tape 30 has a flexible plastic film support 32 having an uncoated face 35 and a single pressure-sensitive adhesive layer 34 on its other face. The adhesive layer 34 is in face-to-face contact with the adhesive layer 24 of the first tape 20. The two tapes 20 and 30 are shown being peeled apart to be applied separately.

Figure 2:
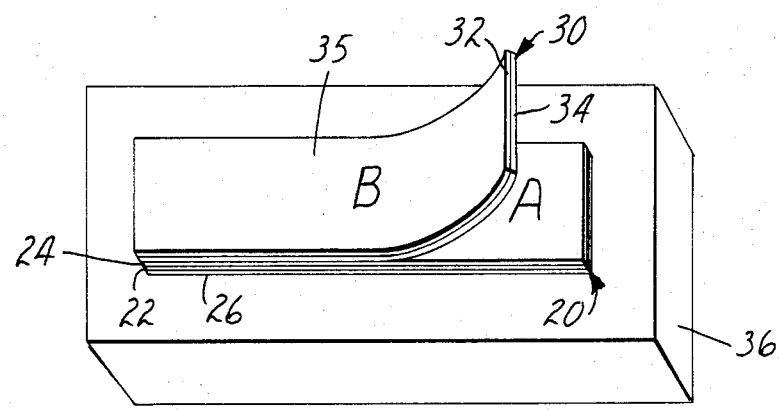
FIG. 2 illustrates a use for the composite of FIG. 1.

FIG. 2 shows that a strip of the first tape 20 has been adhered by its adhesive layer 26 to an article 36, the surface of which has been imprinted with characters symbolically represented by the letter "A". The exposed face of the film support 32 of the second tape 30 has been imprinted with characters symbolically represented by the letter "B".

The "B" characters represent instructions to a consumer for peeling off the second tape 30 and applying it to a use such as that described in Example 1 below. The "A" characters represent instructions for mounting the article 36 by means of the adhered first tape 20. By employing an opaque film as the support 32 of the second tape 30, the message of the "A" characters would not become visible until the second tape 30 had been stripped off.

Figure 3:
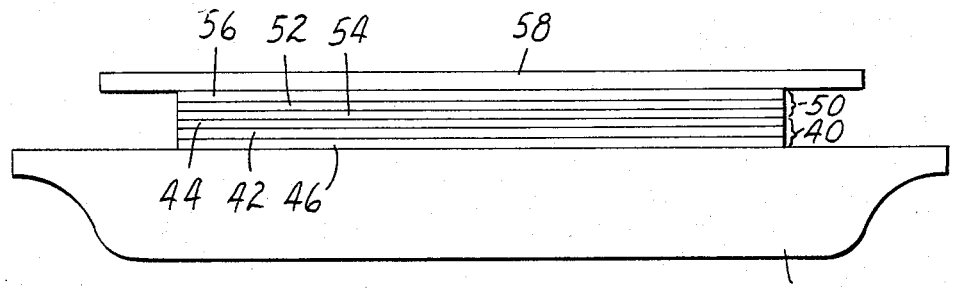
FIG. 3 illustrates a use to which another composite of the invention may be put.

FIG. 3 shows a packet 38 to which is adhered by one of its exposed adhesive layers a composite consisting of two double-coated pressure-sensitive adhesive tapes 40 and 50. The tape 40 consists of a flexible film support 42, at each face of which is a pressure-sensitive adhesive layer 44, 46. The tape 50 is identical to the tape 40 and has a flexible film support 52 and two pressure-sensitive adhesive layers 54, 56. Adhered by the upper adhesive layer 56 is a thin flexible article 58 which can be peeled away, carrying with it the second tape 50 to be remounted by its adhesive layer 54.

In the following example, all parts are given by weight.

EXAMPLE 1

To a mixture 90 parts of isooctyl acrylate and 10 parts of acrylic acid was added 0.04 part of 2,2-dimethoxy-2-phenyl acetophenone photoinitiator. This was purged with nitrogen and partially polymerized by exposure to ultraviolet radiation to provide a viscosity of about 3000 cps. To this was added 0.2 part of 1,6-hexanediol diacrylate crosslinker and an additional 0.1 part of the photoinitiator to provide a syrup.

This syrup was coated onto each face of a transparent biaxially-oriented polyethylene terephthalate film, one face of which had an ultrathin adhesion-promoting primer layer. The thickness of the film was 0.025 mm and the thickness of each coating was 0.05 mm. Each coating was covered by a transparent disposable plastic film having a low-adhesion surface and received 300 mj/cm$^2$ of ultraviolet radiation through that plastic film by being passed between two banks of ultraviolet lamps, each bank consisting of fluorescent black light bulbs (Sylvania F20T12BL), 90% of the emissions of which were between 300 and 400 nm with a maximum at 351 nm. Exposure to the ultraviolet light polymerized each coating to a pressure-sensitive adhesive state, thus creating a double-coated pressure-sensitive adhesive tape having a central flexible polyethylene terephthalate support. While one disposable plastic film was being removed, the resulting double-coated pressure-sensitive adhesive tape was wound upon itself into a roll without a liner and is here called the first tape.

A second tape was made in the same manner as the first except that only the primed face of the polyethylene terephthalate film was coated. While the first tape was being unwound and the disposable plastic film of the second tape was being removed, the exposed adhesive layers of the two tapes were pressed together to provide a composite. While its remaining disposable plastic film was being removed, the composite was wound upon itself for storage and is below called the composite 18 of FIG. 1.

After being stored for more than a month at ordinary room temperature, the two tapes 20 and 30 of the composite 18 of FIG. 1 were peeled apart as illustrated, and there was no delamination of either tape or any offsetting of adhesive, although the unwind force was rather high. Even though one face of each of the polyethylene terephthalate film supports was unprimed, the adhesive layer 26 of the first tape 20 separated cleanly from the uncoated face 35 of the support 32 of the second tape 30, because much greater adhesion is developed when a partially-polymerized syrup is polymerized in contact with the support. Hence, the adhesion-promoting primer layers could have been omitted from the composite 18.

Each adhesive layer of the composite 18 was aggressively tacky and suitable for uses requiring high-performance adhesion. Each adhesive layer exhibited 180° Peelback Value of about 39 N/dm from glass and 42 N/dm from stainless steel; Shear Value of 10,000 minutes.

The composite 18 of FIG. 1 has been experimentally used as follows. A strip of the composite was peeled apart to provide two strips of equal length, and that of the first tape 20 was used to adhere to a vane of a household clothes dryer a porous packet containing a freshener and an anti-static agent. The strip of the second tape 30 was applied to a small monitoring tag such that it extended beyond all sides of the tag. The strip of the second tape 30 was then adhered by the exposed periphery of its adhesive layer 34 to the door of the dryer. The tag, which was visible through the second tape 30, was designed to show the accumulated time of exposure to temperatures exceeding about 50° C. and indicated when the contents of the packet had been substantially exhausted.

Both the packet and the tag remained adhered to the dryer after 40 cycles and were then cleanly stripped away. The two strips of tape had provided convenient mounting of both devices without the need to dispose of any liners.

What is claimed is:

1. Composite including a first tape comprising a flexible support on each face of which is a pressure-sensitive adhesive, and a second tape comprising a flexible support, on at least one face of which is pressure-sensitive adhesive, said first and second tapes being releasably adhered together adhesive face to adhesive face, each pressure-sensitive adhesive
(a) being the polymerized product of a predominantly alkyl acrylate composition, the alkyl groups of which have an average of 4–12 carbon atoms, each said composition being physically compatible with the other,
(b) being substantially solvent-free,
(c) being crosslinked, and
(d) affording at each face a 180° Peelback Value of at least 10 N/dm.

2. Composite as defined in claim 1 wound directly upon itself in roll form.

3. Composite as defined in claim 1 wherein each pressure-sensitive adhesive layer has a 180° Peelback Value of at least 30 N/dm.

4. Composite as defined in claim 1 wherein the flexible support of the first tape is a porous web embedded in a single pressure-sensitive adhesive layer.

5. Composite as defined in claim 1 wherein said face-to-face pressure-sensitive adhesives are chemically different from each other.

6. Composite as defined in claim 1 wherein said face-to-face pressure-sensitive adhesives are identical to each other.

7. Composite as defined in claim 6 wherein the flexible support of the first tape is a porous web embedded in a single pressure-sensitive adhesive layer.

8. Composite as defined in claim 1 wherein the flexible support of at least one of its tapes is transparent, and the pressure-sensitive adhesive of that tape is unpigmented and hence transparent.

9. Composite as defined in claim 1 wherein the polymer of at least one of said pressure-sensitive adhesive layers is a copolymer of alkyl acrylate and at least one copolymerizable polar acrylic monomer in an amount providing up to 12 mol percent of total monomer.

10. Composite as defined in claim 9 wherein said polar monomer is one or more of acrylic acid, methacrylic acid, itaconic acid, acrylamide, methacrylamide, acrylonitrile, methacrylonitrile, and N-vinyl-2-pyrrolidone.

11. Method of making a composite comprising the steps of
(1) coating onto each face of a first flexible support a substantially solvent-free photopolymerizable mixture,
(2) coating onto one face of a second flexible support a substantially solvent-free photopolymerizable mixture,
each said photopolymerizable mixture being physically compatible with the other said mixture and comprising an alkyl acrylate, the alkyl groups of which have an average of 4–12 carbon atoms, and a crosslinker, and
(3) exposing each coating to ultraviolet radiation to polymerize the acrylate to provide a pressure-sensitive adhesive layer which
(a) is crosslinked and
(b) affords at each face a 180° Peelback Value of at least 10 N/dm,
(4) superimposing the resulting two tapes adhesive face to adhesive face, which two tapes can later be peeled apart without delamination or offsetting of adhesive and used separately.

12. Method as defined in claim 11 wherein prior to each of steps (1) and (2) and before adding crosslinker, there is a step of partially polymerizing each photopolymerizable mixture by ultraviolet radiation to provide a syrup having a coatable viscosity.

13. Method as defined in claim 11 wherein each of the first and second flexible supports is a plastic film.

14. Method as defined in claim 13 wherein prior to each of steps (1) and (2) is the step of labelling each flexible support to indicate the use to which the tape containing that support is to be put.

15. Method as defined in claim 11 wherein step (2) involves coating only one face of the second flexible support.

16. Method as defined in claim 11 wherein step (2) involves coating each face of the second flexible support.

* * * * *